Jan. 18, 1966 U. P. TRUDEAU 3,230,061
METHOD AND APPARATUS FOR FORMING HOLLOW GLASS ARTICLES
Filed Sept. 28, 1961 4 Sheets-Sheet 4

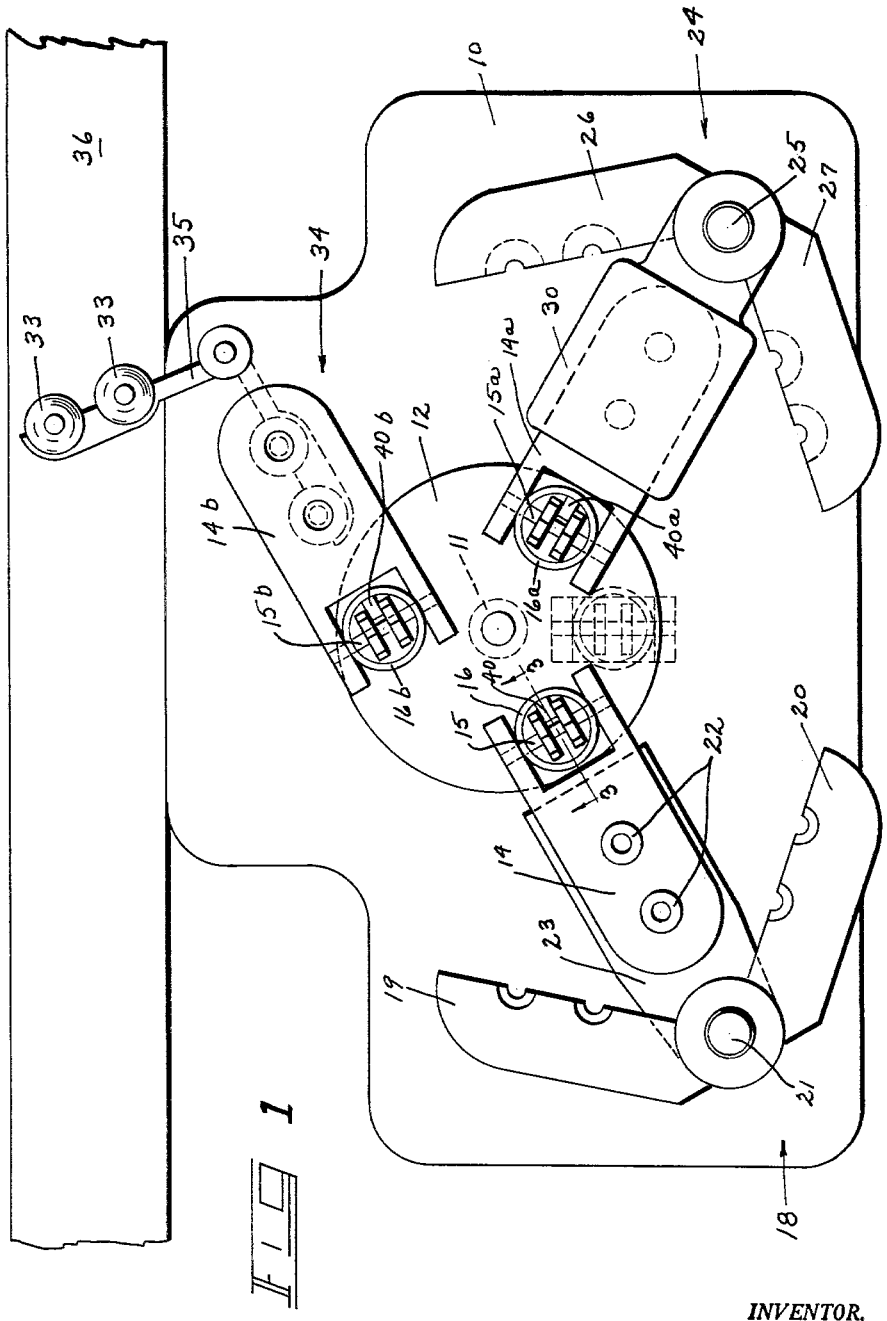

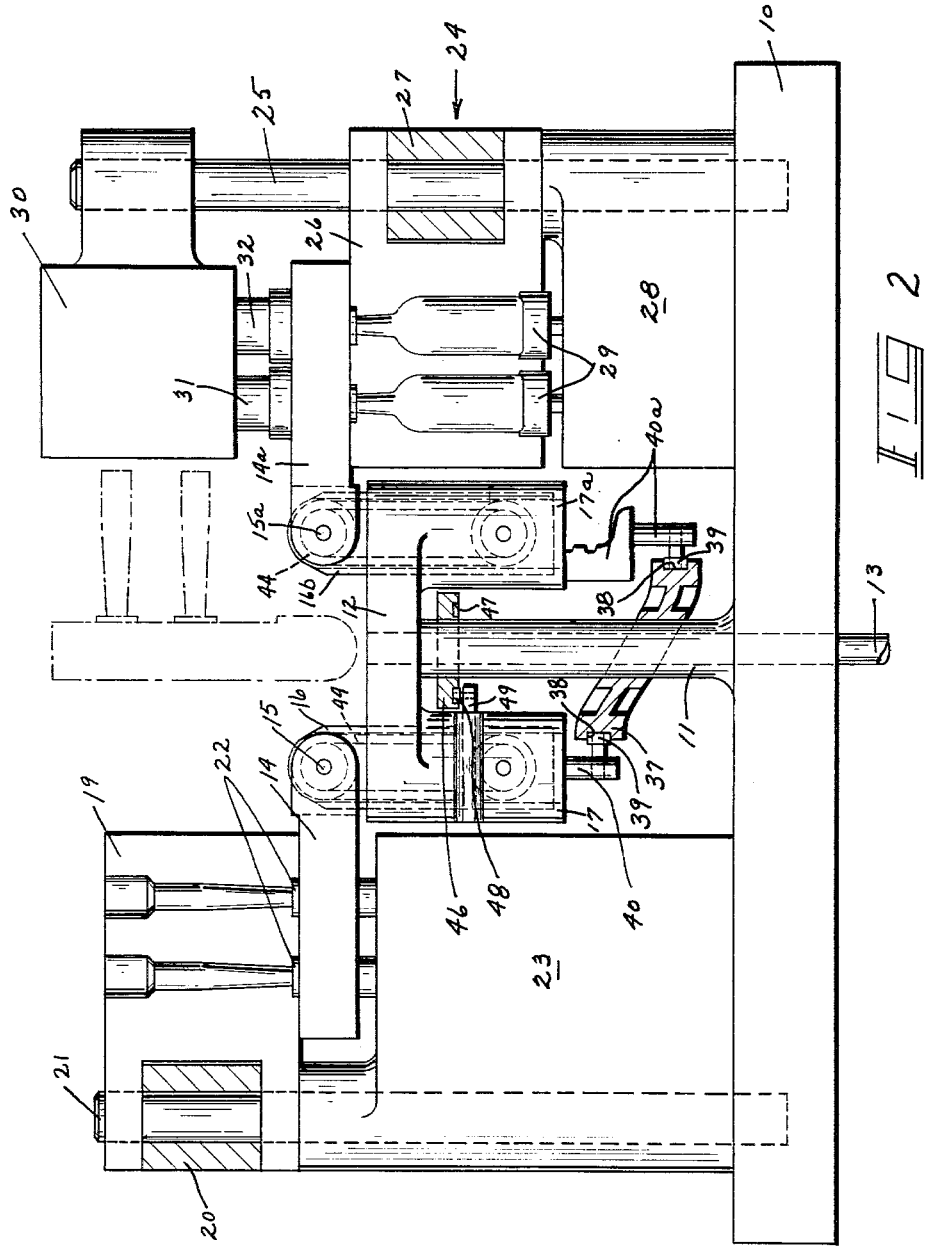

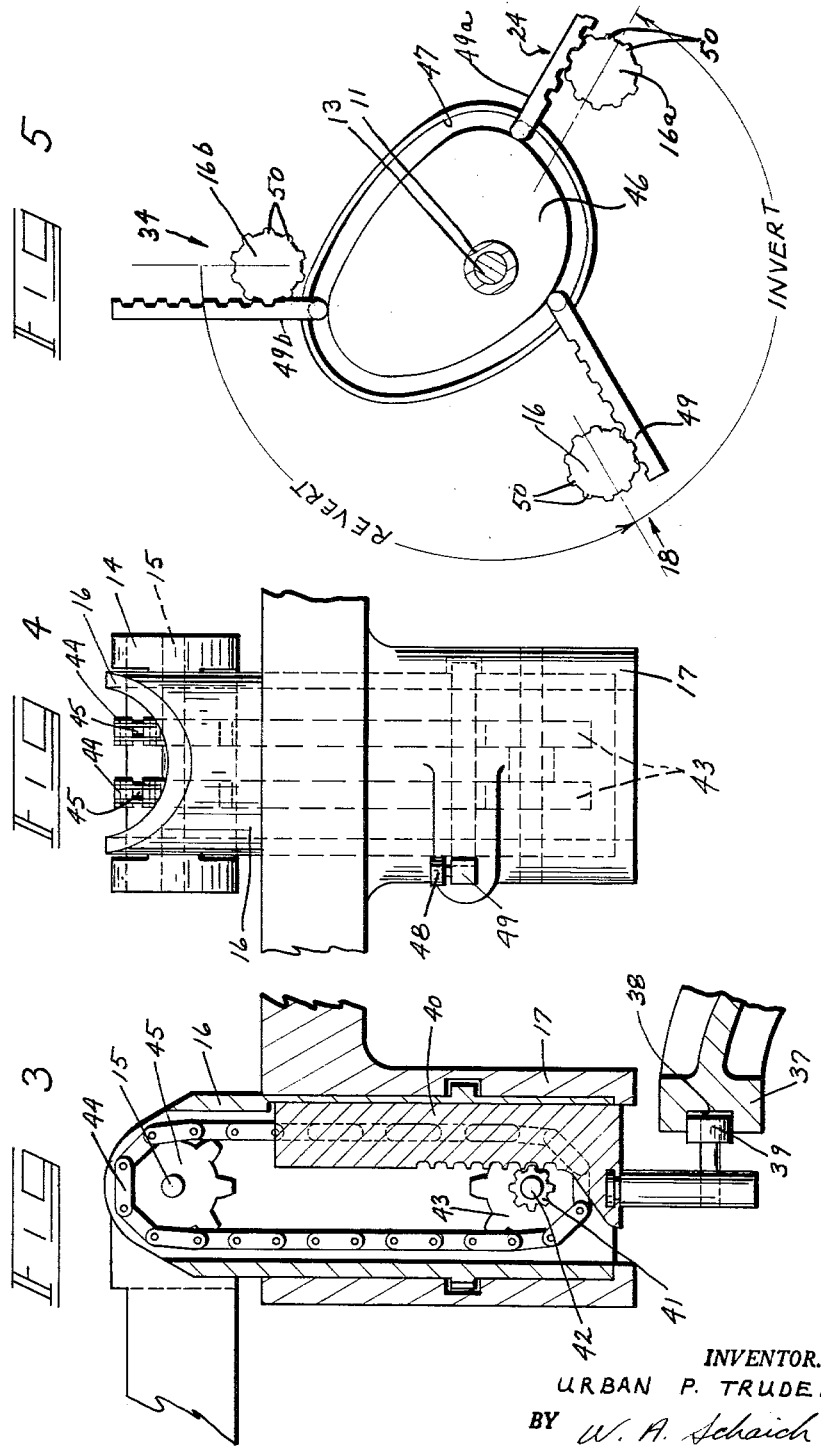

INVENTOR.
URBAN P. TRUDEAU
BY *W. A. Schaich*
*D. T. Innis*
ATTORNEYS

United States Patent Office 3,230,061
Patented Jan. 18, 1966

1

3,230,061
METHOD AND APPARATUS FOR FORMING
HOLLOW GLASS ARTICLES
Urban P. Trudeau, Toledo, Ohio, assignor to Owens-
Illinois Glass Company, a corporation of Ohio
Filed Sept. 28, 1961, Ser. No. 141,336
6 Claims. (Cl. 65—68)

This invention relates to a method and apparatus for forming hollow glass articles, for example, bottles. More specifically, this invention relates to method and apparatus for forming narrow neck containers in which formed parisons are transferred to blow molds in a novel manner in a full-overlap cycle. The transfer of the parisons is accomplished without subjecting the parisons to excessive centrifugal force during their revert.

It has been the practice in the past when forming narrow neck containers to form the parisons in inverted form and then revert the parison by its neck into a blow mold where the parison is expanded to the shape of a finished bottle. The parison is transferred by a pivot arm which carries the neck mold and the parison is released to the blow mold so that the neck mold can be inverted during blowing of the parison.

With this particular cycle of operation, where a single transfer arm operates to transfer all of the parisons formed in the parison mold to the blow mold, the time of operation depends to a certain extent upon the rate of transfer of the parison and there is some lost-time in the blowing of the parison due to the fact that the neck rings must release the parisons, and move out of the way in order for the blow head to seat over the neck of the parison.

A more recent development, as exemplified by the U.S. Pat. No. 2,918,756, granted December 29, 1959, to E. H. Mumford is the use of a horizontally rotatable neck mold carrying turret in which three sets of neck molds are mounted on the turret. The parisons are formed in an inverted position and transferred to the blow mold by rotation of the turret. During the index of the turret, the neck mold pivots about a horizontal axis thus reverting the parison to an upright position at the blow mold.

In this manner the parison is expanded within the blow mold in an upright position. This latter development imposes stress on the parison during transfer which tends to distort the parison. The particular teaching of this patent, however, relates to an arrangement for reverting the parison by swinging the parison toward the center of rotation of the turret in an attempt to minimize centrifugal forces acting on the parison.

It is an object of this invention to provide a method and apparatus for transferring plural parisons of the narrow neck type which are formed in an inverted position to a blow mold by a combined motion of pivoted neck rings and rotating turrets.

It is an additional object of this invention to provide apparatus for transferring and inverting parisons wherein the parisons are subjected to a minimum amount of distorting stress.

It is a further object of this invention to provide method of transferring plural parisons from the parison mold to the blow mold by inverting the neck rings about a horizontal axes while said horizontal axis is being rotated about a vertical axis.

Other and further objects and advantages will be apparent from the accompanying drawings wherein:

FIG. 1 is a schematic top plan view of the apparatus of the invention illustrating the three positions of the neck mold supporting arms.

FIG. 2 is a front elevational view of the apparatus of FIG. 1 with portions of the device in section to better illustrate the invention.

2

Figure 6:
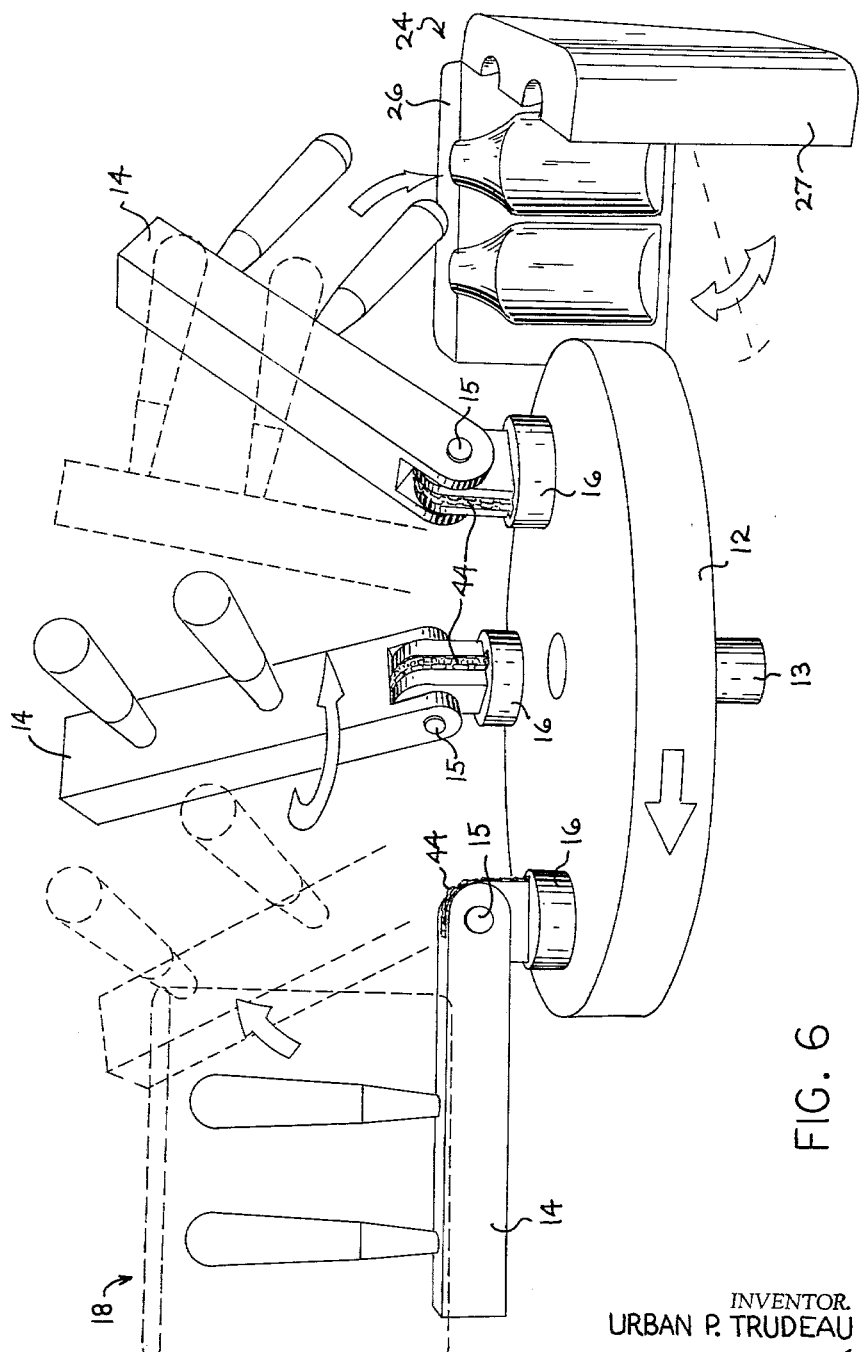

FIG. 3 is an enlarged cross-sectional view taken at line 3—3 on FIG. 1.

FIG. 4 is an elevational view of the transfer mechanism of FIG. 3 looking toward the left in FIG. 3.

FIG. 5 is a schematic plan view of the horizontal cam, illustrating the relationship of the cam and the mold arm rotating mechanism.

FIG. 6 is a diagrammatic view illustrating the complex movement of the parisons as they are transferred from the parison mold to the blow mold.

Referring now to FIGS. 1 and 2 the parison transfer mechanism of the invention is shown mounted on a base 10. A centrally located vertical pedestal 11 extends upwardly from the base and serves as the support for a rotatable turret 12. The turret 12 is horizontally disposed and generally circular, as viewed from above in FIG. 1. The turret is driven by a vertical shaft 13 which extends through the pedestal 11 and is fixed to the center of the turret. The shaft 13 is driven by the usual machine drive mechanism, not shown. The drive will rotate the shaft 13 and cause the turret 12 to be indexed in steps of 120°. The turret 12 serves as the supporting structure for three neck mold carrying arms 14, 14a and 14b. The arms 14 are supported for pivotal movement about the axis of horizontal shafts 15, 15a and 15b which generally lie in a horizontal plane parallel to the upper surface of the turret 52. The support for the arms 14 takes the form of cylindrical members 16, 16a and 16b which are mounted for rotation about a vertical axes within cylindrical supporting portions 17, 17a and 17b (not shown) of the turret 12. The details of the mechanism for rotating the cylindrical members 16, 16a and 16b for pivoting the arms 14, 14a and 14b, about the axes of the shafts 15, 15a and 15b will be described in detail hereinafter with reference to FIGS. 3 to 5.

Generally speaking, the forming machine is a three-station full-overlap cycle machine in which the parisons are formed at one station while previously formed parisons are blown at a second station and the finished bottles are being removed at a third station. Each of these operations are being carried on simultaneously. The indexing of the turret 12 will carry the neck mold carrying arm 14 approximately 120° about the axis of the turret and the parisons will be transferred from the parison forming station to the blow mold station. Blown articles will be carried to the takeout station by the arm 14b. Inasmuch as this machine is primarily for forming narrow neck ware, the parisons will be formed in an inverted position. A split parison mold having arms 19 and 20 which are mounted for relative swinging motion on a vertical post 21 is located at the parison forming station 18. The post 21 extends vertically out of the base 10 and serves to support arms 19 and 20 for pivotal motion toward and away from each other into closed position overlying the neck mold carrying arm 14 located at the parison forming station 18. Each mold arm carries two sets of split neck molds 22 so that when the arms 19 and 20 are closed, they form complete parison mold cavities.

Mold charges are delivered through the open upper end of the parison mold cavities in the usual manner. Mechanism for forming the parisons may take the form of plungers which are vertically movable through the neck molds 22. This mechanism is contained within the support member 23.

The blow molding station 24 comprises a vertical post 25 to which a pair of blow mold arms 26 and 27 are hingedly mounted. The blow mold arms are opened and closed by a suitable mechanism contained within base structure 28. The structure 28 will also contain mechanism for raising a pair of bottom plates 29 into closing relationship with respect to the bottoms of the closed blow mold arms 26 and 27. Mounted above the base 28 and pivotally supported by the post 25 is a blow head mechanism 30 having two depending blow heads 31 and 32. The blow head mechanism 30 is mounted to pivot into alignment with the mold cavities formed in the blow mold and the blow heads 31 and 32 are adapted to reciprocate into and out of the blow head mechanism 30. In the position shown in FIG. 2, the blow heads are seated on the inverted neck mold supporting arm 14a in position to expand parisons which are enclosed within the blow mold arms 26 and 27.

After the parisons have been expanded within the blow mold, the turret 12 is indexed 120° in a counterclockwise direction and the neck mold supporting arm 14a will carry the formed bottles 33 to the takeout station 34 of the machine. At the takeout station the neck molds 22 will open to release the formed bottles and a sweep out arm 35 will transfer the bottles to a continuously moving conveyor 36. After the bottles have been released from the neck mold carrying arm 14b, at the takeout station 34, further index of the turret will revert the arm 14 thus placing the neck molds 22 into proper position at the parison forming station 18.

The invert and revert movement of the arms 14, 14a and 14b, about the axes of their shafts 15, 15a and 15b, is controlled by the shape of a cam 37. The cam 37 which is fixed to the pedestal 11 has a recess 38 within which rollers 39 are adapted to travel. The rollers 39, of which there are three, are operatively connected to the lower end of vertically movable racks 40, 40a and 40b.

As can best be seen in FIG. 2, the cam 37 has a vertical slope thus upon rotation of the turret 12 the roller 39 at the parison forming station 18 will move downward in a descending arc to the position shown for the roller 39 located at the blow station 24. As the roller 39 moves downwardly it drives the rack 40 which is in mesh with a pinion 41 causing the pinion to rotate a horizontal shaft 42. The shaft 42 has a pair of sprocket wheels 43 mounted thereon which are in mesh with a pair of endless chains 44. The chains 44 pass over a second pair of sprocket wheels 45 which are mounted on the horizontal shaft 15.

Thus it can be seen that vertical motion of the rack 40 will rotate the lower sprocket wheels 43. Rotation of the lower sprocket wheels 43 will be transmitted by the chains 44 to the upper sprocket wheels 45. Inasmuch as the shaft 15 is connected to the sprocket wheels 45 and the neck mold supporting arm 14, rotation of the shaft 15 by the chains 44 will result in pivoting the arm 14 about the horizontal axis of the shaft 15. In this manner the parisons, which, as previously described, are formed in inverted position will be inverted to an upright position during the 120° indexing of the turret. This invert takes place between the parison forming station 18 and the blow mold station 24.

The motion of the parisons and their supporting invert arm is clearly illustrated in the schematic view of FIG. 6. Since the invert and revert motions of the arms 14, 14a and 14b are taking place during the indexing of the turret, it is necessary that the shafts 15, 15a and 15b also be turned about vertical axes extending parallel to the axis of the drive shaft 13 so that the parisons will be inverted in proper relationship and placed with respect to the blow mold arms 26 and 27 at the blow station 24.

Turning of the shaft 15 is accomplished by rotating the cylindrical member 16 which is mounted in portion 17 of the turret for rotation about its longitudinal axis. This rotary motion is controlled by a second fixed cam 46 mounted on the pedestal 11, vertically above the previously mentioned cam 37. The cam 46 has an annular groove 47 formed in its under-surface within which a roller 48 is adapted to travel. The roller 48 is connected to a horizontally disposed rack 49 which extends through an opening in the cylindrical supporting portion 17 of the turret 12 and meshes with gear teeth 50 formed around the circumference of the cylindrical member 16.

Thus it can be seen from viewing FIG. 5 wherein the shape of the cam slot 47 is schematicaly depicted, that upon rotation of the turret, the racks 49, 49a and 49b will move with the turret and in following varying radius of the slot in the cam will rotate the cylindrical members 16, 16a and 16b about their axes.

The operation of the invert mechanism and its relationship to the indexing motion of the turret can best be seen when viewing FIG. 6. The arrows appearing on FIG. 6 illustrate the motions taking place during the movement of the arm 14 from the parison forming station 18 to the blow molding station 24. After the parisons have been formed at the parison forming station 18, the turret 12 is indexed 120° counterclockwise.

As the turret 12 indexes the rack 40 which is following the contour of the cam 37, it will begin to move downward causing the neck molds 14 to pivot upwardly about the shaft 15.

As the turret 12 indexes the cylinders 16, 16a and 16b will be carried 120° and the racks 49, 49a and 49b which are carried by the turret will rotate the cylinders 16, 16a and 16b depending upon the position of the racks with respect to the center of rotation of the turret. The arm 14 and its associated cylinder 16, during transfer of the parisons from the parison forming station 18 to the blow mold station 24, will experience a compound motion. The arm 14 will be pivoted upwardly by rotation of the shaft 15 while at the same time the shaft 15 will be rotated in a clockwise direction by the rack 49, in engagement with the cylinder 16 so that after an index of 60° the arm will assume the position shown in dotted line on FIGS. 1 and 2. With the completion of the index, the arm 14 will be inverted and the cylinder 16 will have been rotated 180° in a clockwise direction.

After the parisons have been expanded within the blow mold and are retained within the neck molds, carried by the arm 14a, indexing of the turret will move the arm 14a in a counterclockwise direction toward the takeout station 34. During this indexing motion the cylinder 16a will be rotated approximately 60° in a clockwise direction so that the arm 14a when it assumes the position shown in FIG. 1 of the arm 14b, the takeout arm 35 will be capable of sweeping out the completed finished bottles 33. After the ware or bottles 33 have been released from the neck mold in the arm 14b, and the turret is indexed, the arm 14b will be pivoted by the shaft 15b while at the same time the cylinder 16b will be rotated 240° in a counterclockwise direction. This motion of the arm 14b is termed "revert" and after completion of the revert, the arm 14b will be in position of arm 14 as viewed in FIG. 1.

Thus it can be seen that there is a complete overlap cycle of operation of the machine in that while parisons are being formed at the parison forming station 18, previously formed and transferred parisons are being blown at the blow mold station 24, and previously blown ware is being removed or swept out at the takeout station 34.

Various modifications may be resorted to within the spirit and scope of the appended claims.

I claim:
1. In a method of forming hollow glass articles comprising the steps of forming a parison in inverted position, moving said parison from the parison forming position to a blow molding position, said movement being effected by inverting said parison about a horizontal axis, simultaneously moving said axis in an arcuate path about a first vertical axis, and rotating said horizontal axis about a second vertical axis normal to said horizontal axis whereby said parison is inverted and transferred to a blowing position.

2. The method of inverting an inverted parison which comprises simultaneously moving said parison about a horizontal and two vertical axes wherein movement of the parison about one vertical axis is in a direction opposite to the movement about the other vertical axis.

3. The method of spacial transferring an inverted parison to an upright position which comprises bodily moving said parison about a vertical axis through an arc of approximately 120°, and simultaneous therewith moving said parison about a horizontal axis through an arc of 180° and about a second vertical axis through an arc of approximately 180° in a direction opposite to the movement about the first-mentioned vertical axis.

4. Apparatus for forming hollow glass articles comprising a turret, means for rotating said turret about a first vertical axis, a neck mold supporting arm, means for mounting said neck mold supporting arm on said turret, said means permitting vertical swinging motion of said arm with respect to said turret, means for supporting said neck mold support for rotation about a second vertical axis which is laterally displaced from said first axis, and means for rotating said arm support and pivoting said arm for concurrently transferring parisons by the neck mold supporting arm by movement about three axes.

5. Apparatus for forming hollow glass articles comprising a neck mold carrying arm adapted to cooperate with an overlying parison mold, a horizontal turret, means for mounting said neck mold arm on said turret, means for rotating said turret about a central vertical axis and means carried by said turret and connected to said mold carrying arm for inverting said arm and parisons in response to rotation of said turret, said last-mentioned means being effective to vertically and horizontally rotate said neck mold supporting arm during rotation of said turret.

6. Apparatus for forming hollow glass articles comprising a parison forming station, a bolw mold station, and a takeout station located at circumferentially spaced points about a vertical axis, a horizontal turret mounted for rotation about said vertical axis, a neck mold carrying arm positioned at each of said three stations, said neck mold carrying arms being mounted on said turret for movement therewith, said mounting comprising vertically positioned sleeves mounted for rotation about their vertical axes with respect to said turret, means mounting one end of said arms to said sleeves for pivotal movement about horizontal axes, and means for simultaneously rotating said sleeves and pivoting said arms in response to rotation of said turret.

References Cited by the Examiner
UNITED STATES PATENTS

| | | | |
|---|---|---|---|
| 2,918,756 | 12/1959 | Mumford | 65—76 |
| 3,060,707 | 10/1962 | Hamilton | 65—236 |

DONALL H. SYLVESTER, *Primary Examiner*.